United States Patent
del Rio-Romero et al.

(10) Patent No.: US 8,301,156 B2
(45) Date of Patent: Oct. 30, 2012

(54) LOAD BALANCING FOR CAPACITY IMPROVEMENT IN MOBILE WIRELESS COMMUNICATION NETWORKS

(75) Inventors: Juan Carlos del Rio-Romero, Barcelona (ES); Juan Jose Guerrero-Garcia, Malaga (ES); Salvador Pedraza-Moreno, Malaga (ES); Juan Ramiro-Moreno, Malaga (ES); Angel Luis Rivada-Antich, Malaga (ES)

(73) Assignee: Optimi Corporation, Atlanta, GA (US)

( * ) Notice: Subject to any disclaimer, the term of this patent is extended or adjusted under 35 U.S.C. 154(b) by 523 days.

(21) Appl. No.: 12/237,910

(22) Filed: Sep. 25, 2008

(65) Prior Publication Data

US 2010/0075682 A1    Mar. 25, 2010

(51) Int. Cl.
*H04W 72/00*    (2009.01)
*H04W 4/00*    (2009.01)
*H04L 12/26*    (2006.01)

(52) U.S. Cl. ......... 455/453; 370/235; 370/252; 370/338

(58) Field of Classification Search .................. 455/453; 370/235

See application file for complete search history.

(56) References Cited

U.S. PATENT DOCUMENTS

| | | | |
|---|---|---|---|
| 6,542,482 B1 * | 4/2003 | Johansson et al. | 370/331 |
| 2006/0142021 A1 * | 6/2006 | Mueckenheim et al. | 455/453 |
| 2009/0323530 A1 * | 12/2009 | Trigui et al. | 370/235 |

* cited by examiner

*Primary Examiner* — Charles Appiah
*Assistant Examiner* — Natasha Cosme
(74) *Attorney, Agent, or Firm* — Hope Baldauff Hartman, LLC (57) ABSTRACT

Technologies for load balancing among neighboring cells of a mobile wireless communication network can reduce traffic congestion and improve network system capacity. Load balancing can be accomplished by adjusting various radio access network parameters. Such adjustments may be made at the cell level or at the neighboring cell level. The adjustments can be applied iteratively in response to various collected operational statistics. The adjustments can adapt cell size and cell shape as well as adapt handover to maximize system resource and hardware utilization. An iterative process of optimization can periodically collect performance statistics and network configuration from a mobile wireless network. The collected information can be periodically analyzed to determine parameter adjustments. Configuring additional capacity from the communication network can prevent or substantially delay the acquisition of additional hardware resources to mitigate system capacity issues.

20 Claims, 5 Drawing Sheets

LOAD BALANCING FOR CAPACITY IMPROVEMENT IN MOBILE WIRELESS COMMUNICATION NETWORKS

BACKGROUND

Wireless communication networks, such as those supporting mobile telephone and data services, naturally have operational limitations. These limitations may be physical limitations, such as equipment limitations, frequency allocations, power limits, base station placement, antenna configurations, noise, environmental factors, or otherwise. Limitations may also be introduced by suboptimal system configurations. One manifestation of wireless system limitation is a ceiling on capacity. Capacity can be considered in terms of a number of mobile radios supported, a data rate supported, a number of calls supported, or some other measure of wireless system capacity.

Vendors of mobile communication infrastructure equipment sometimes offer radio resource management (RRM) features. While these RRM features can be leveraged to relieve brief, periodic congestion problems, the solutions offered are generally locally oriented over a limited physical domain. Moreover, such techniques are generally based on reducing user resources. For example, degrading call or data quality, blocking calls, forcing handovers, and call preemption are some traditional RRM techniques. Such capacity overload mitigation techniques may be suitable for brief periods of congestion. For example, on the scale of seconds or tens of minutes. However, such approaches do not typically support persistent capacity improvement. Furthermore, these approaches generally do not guarantee call quality or support increased long-term traffic trends.

Traditionally long-term solutions to capacity problems in wireless communication networks involve acquiring additional resources. For example, purchasing and installing additional base station equipment is a typical approach to increasing the capacity of a mobile communication system. Unfortunately, such an approach can have considerable lead-time delays as well as considerable costs in both capital expenditure and operating expenses. Furthermore, adding physical resources is generally a locally isolated solution with little flexibility for reallocating increased capacity within the network.

It is with respect to these considerations and others that the disclosure made herein is presented.

SUMMARY

Technologies are described herein for load balancing among neighboring cells of a mobile wireless communication network. Such load balancing can reduce traffic congestion and improve network system capacity. Load balancing can be accomplished by adjusting various radio access network (RAN) parameters. Such adjustments may be made at the cell level or at the neighboring cell level. The adjustments can be applied iteratively in response to various collected operational statistics. The adjustments can adapt cell size and cell shape as well as adapt handover to maximize system resource and hardware utilization. An iterative process of optimization can periodically collect performance statistics and network configuration from a mobile wireless network. The collected information can be periodically analyzed to determine parameter adjustments. Extracting additional capacity from the communication network can prevent or substantially delay acquisition of additional hardware resources to address capacity concerns.

According to one embodiment, cell size and cell shape can be adjusted. The bounds between a cell and a neighboring cell can be adjusted to balance the offered traffic among multiple sets of base station resources. The adjustments can be made by adjusting handover parameters, power levels, antenna tilt, and various other system characteristics.

According to another embodiment, load balancing can allocate traffic to maximize the hardware utilization. Loaded cells or operating frequencies can have associated load reallocated to underutilized frequencies, cells, or network systems.

According to yet another embodiment, an iterative process of optimization can periodically collect performance statistics and network configuration. The iterative process can use the collected information to adjust various operating parameters in the system to achieve a desired load balancing goal.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for load balancing within a mobile wireless radio network. Through the use of the embodiments presented herein, system capacity can be improved within a wireless radio network by iteratively adjusting cell size and shape while also adjusting system resource utilization by updating handover parameters. Network capacity problems can be related to traffic congestion or pre-congestion, such as excessive resource utilization. A capacity issue can be detected by collecting metrics associated with key performance indicators (KPI). For example, statistics can be collected that are associated with transmitter power utilization, code allocation utilization, aggregation link utilization, channel elements, call processor load, and various other system characteristics. Network statistics can be retrieved from the operation and support system (OSS) or any intermediate system element.

While the subject matter described herein is presented in the general context of program modules that execute in conjunction with the execution of an operating system and application programs on a computer system or embedded processor system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for improving system capacity within a mobile wireless radio network using load balancing.

Figure 1:
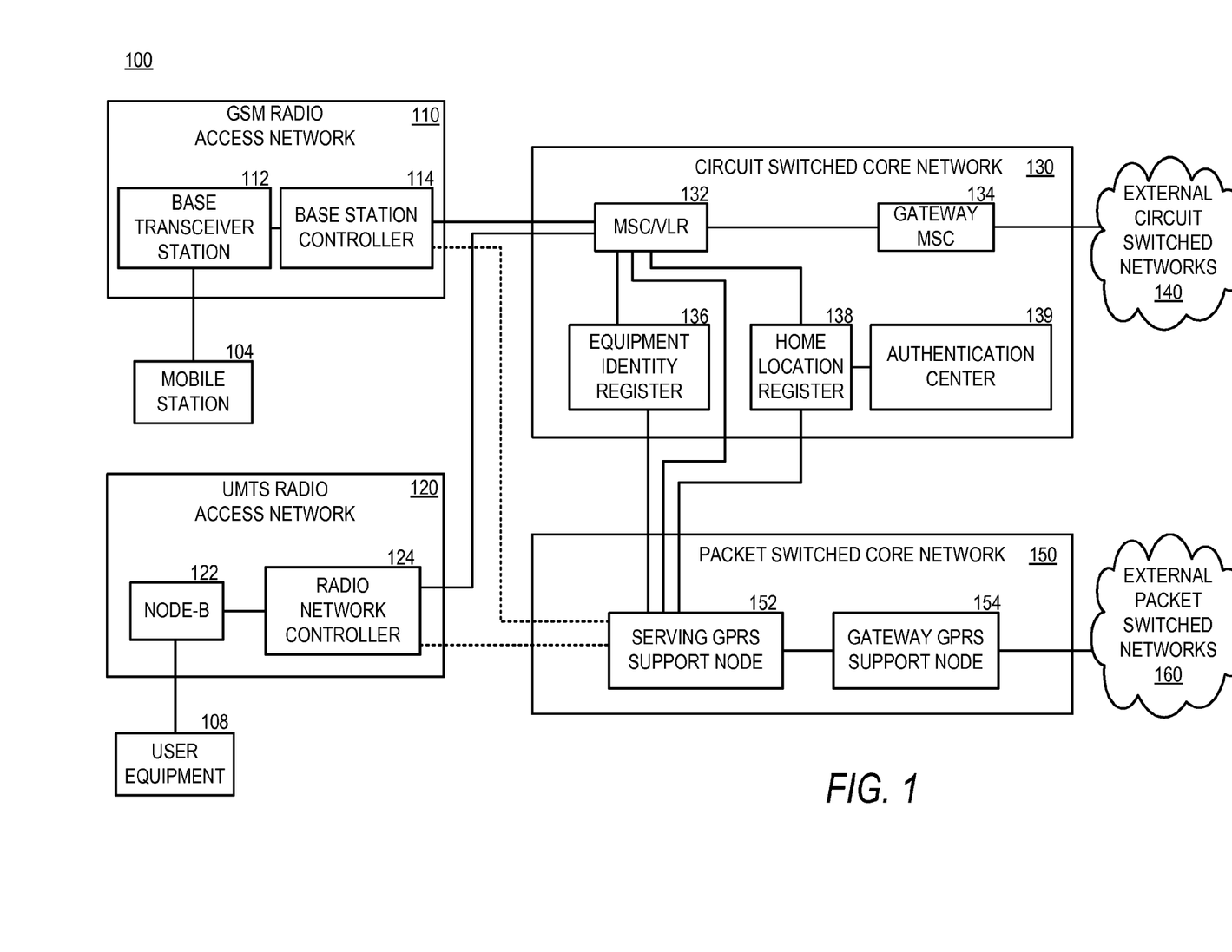
FIG. 1 is a network architecture diagram illustrating aspects of a GSM and UMTS mobile wireless communication system according to one exemplary embodiment.

Turning now to FIG. 1, details will be provided regarding an illustrative operating environment for the implementations presented herein, as well as aspects of several software components that provide the functionality described herein for load balancing within a mobile wireless radio network. In particular, FIG. 1 is a network architecture diagram illustrating aspects of a Global System for Mobile (GSM) and Universal Mobile Telecommunications System (UMTS) mobile wireless communication system 100 according to one exemplary embodiment.

A GSM radio access network (GSM RAN) 110 can service multiple mobile subscribers such as a mobile station 104. A base station subsystem (BSS) can handle traffic and signaling between a mobile station 104 and the telephone switching network. The BSS can include a base transceiver station (BTS) 112 providing multiple transceivers, antennas, and other radio equipment to support transmitting and receiving radio signals with the mobile stations 104 being serviced. A "Um" link, or air interface, can be established between each mobile station 104 and the BTS 112.

A base station controller (BSC) 114 associated with the BTS 112 can provide control intelligence for the GSM RAN 110. A BSC 114 can have multiple BTS systems 112 under its control. The BSC 114 can allocate radio channels, receive measurements from mobile stations 104, and control handovers from one BTS 112 to another. The interface between a BTS 112 and a BSC 114 can be an "Abis" link. The BSC 114 can act as a concentrator where many Abis links can be aggregated and relayed to the network core.

A UMTS radio access network (UMTS RAN) 120 can provide another example of a base station subsystem (BSS). UMTS is an example of a third generation (3G) mobile communications technology. The UMTS RAN 120 can service mobile units, such as user equipment 108. The air interface in a UMTS RAN 120 can be referred to as a "Uu" link. A UMTS base station subsystem can include a Node-B 122 and a radio network controller (RNC) 124. A Node-B 122 and a RNC 124 can be interconnected by an "Iub" link.

An RNC 124 or BSC 114 can generally support as many as hundreds of Node-B 122 or BTS 112 respectively. A Node-B 122 or BTS 112 can generally support three or six cells, although other numbers may be used. Multiple GSM RAN 110 base stations or UTMS RAN 120 base stations can connect to either or both of a circuit switched core network 130 or a packet switched core network 150.

A BSC 114 within a GSM RAN 110 can connect to a MSC/VLR 132 within a circuit switched core network 130 over an "A" Link. An "A" link can carry traffic channels and SS7 control signaling. Similarly, a BSC 114 within a GSM RAN 110 can connect to a serving GPRS support node (SGSN) 152 within a packet switched core network 150 over a "Gb" link.

An RNC 124 within a UMTS RAN 120 can connect to a MSC/VLR 132 within a circuit switched core network 130 over an "Iu-CS" link. Similarly, an RNC 124 within a UMTS RAN 120 can connect to a serving GPRS support node (SGSN) 152 within a packet switched core network 150 over an "Iu-PS" link.

Within the circuit switched core network 130, the MSC/VLR 132 can interface to an equipment identity register 136, a home location register 138, and an authentication center 139. The MSC/VLR 132 can also interface to a gateway mobile switching center 134 to access external circuit switched networks 140. External circuit switched networks 140 may include Integrated Services Digital Network (ISDN) systems, Public Switched Telephone Network (PSTN) systems, and various other circuit switched technologies.

Within the packet switched core network 150, the SGSN 152 can interface with a gateway GPRS support node (GGSN) 154 to access external packet switched networks 160. External packet switched networks 160 can include the Internet, intranets, extranets, and various other packet data network technologies.

Figure 2:
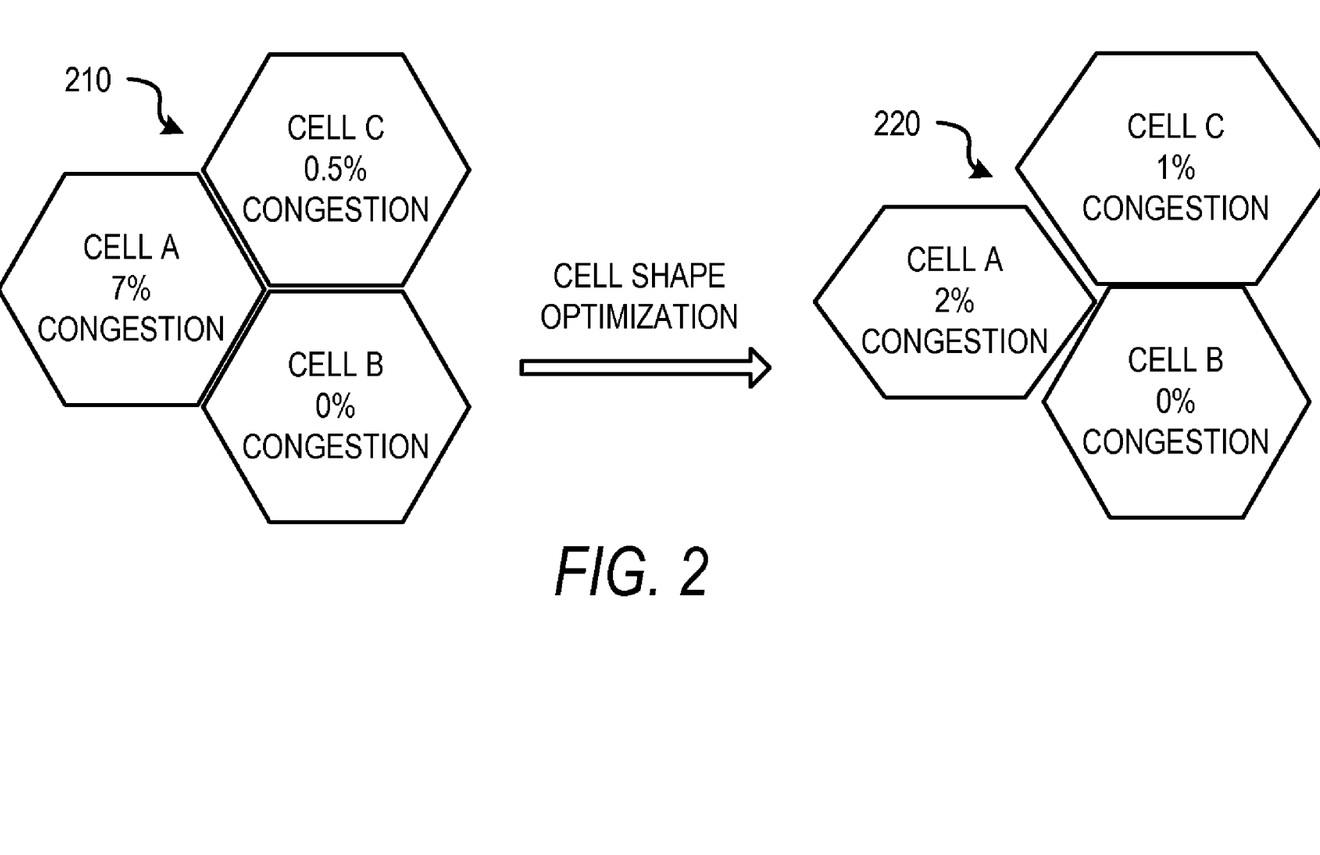
FIG. 2 is a mobile radio cell diagram illustrating cell reshaping for load balancing between neighboring cells according to one exemplary embodiment.

Referring now to FIG. 2, a mobile radio cell diagram illustrates cell reshaping for traffic balancing between neighboring cells according to one exemplary embodiment. A mechanism for load balancing can reshape neighboring cells to reallocate traffic from a highly loaded cell to a neighboring cell with spare capacity. For example, an initial cell structure 210 can be reshaped to a modified cell structure 220. In the illustrated example, a reduction in the size and shape of CELL A and an increase in the size and shape of neighboring CELL C can provide a reallocation of traffic from CELL A to neighboring CELL C.

Cell coverage adjustment can be accomplished using pilot power adjustment. Pilot power can be adjusted between neighboring cells so as to displace the center point between the two cells. Shifting the center between the two cells closer to the overloaded cell can effectively reduce the size of the overloaded cell and thus reallocate traffic from that cell to the neighboring cell.

Cell coverage adjustment can be accomplished using antenna tilt. A remote electrical antenna tilt (RET) mechanism can provide a downward tilt to an antenna in an overloaded cell. Applying a downward tilt can reduce the propagation horizon of the antenna and effectively reduce the size of the overloaded cell. Such a reduction can support a reallocation of traffic from the overloaded cell to a neighboring cell.

Intra-frequency (IAF) neighbors, or those on the same carrier frequency, can be considered for neighboring load balancing. Inter-frequency (IEF) neighbors, or those on different carrier frequencies, can also be considered for neighboring load balancing techniques.

Coverage checks can be performed while adjusting cell coverage. When reducing pilot power or increasing antenna tilt for load balancing, there can be a reduction in cell coverage area and thus a risk of coverage loss in the network system. Likewise, when increasing the pilot power or reducing the antennae tilt, coverage area can be increased thus risking over-shots or excessive interference to neighboring cells.

A coverage check against reduced coverage or coverage loss can use any statistic that counts events triggered by call drop conditions falling below a certain poor quality threshold. For example, excessive inter-system handovers may indicate coverage loss. In such conditions, cell coverage reduction for load balancing can be avoided.

A coverage check against excess coverage or over-shoot can use propagation delay counters. When propagation delay is higher than a specified threshold a cell may be suffering from over-shoot. Also high up-link block error rate (UL BLER) or high mobile device transmit power can indicate that a cell may be suffering from over-shoot. When the cell suffers from overshooting or excessive overlapping, cell coverage increase for load balancing may cease.

Figure 3:
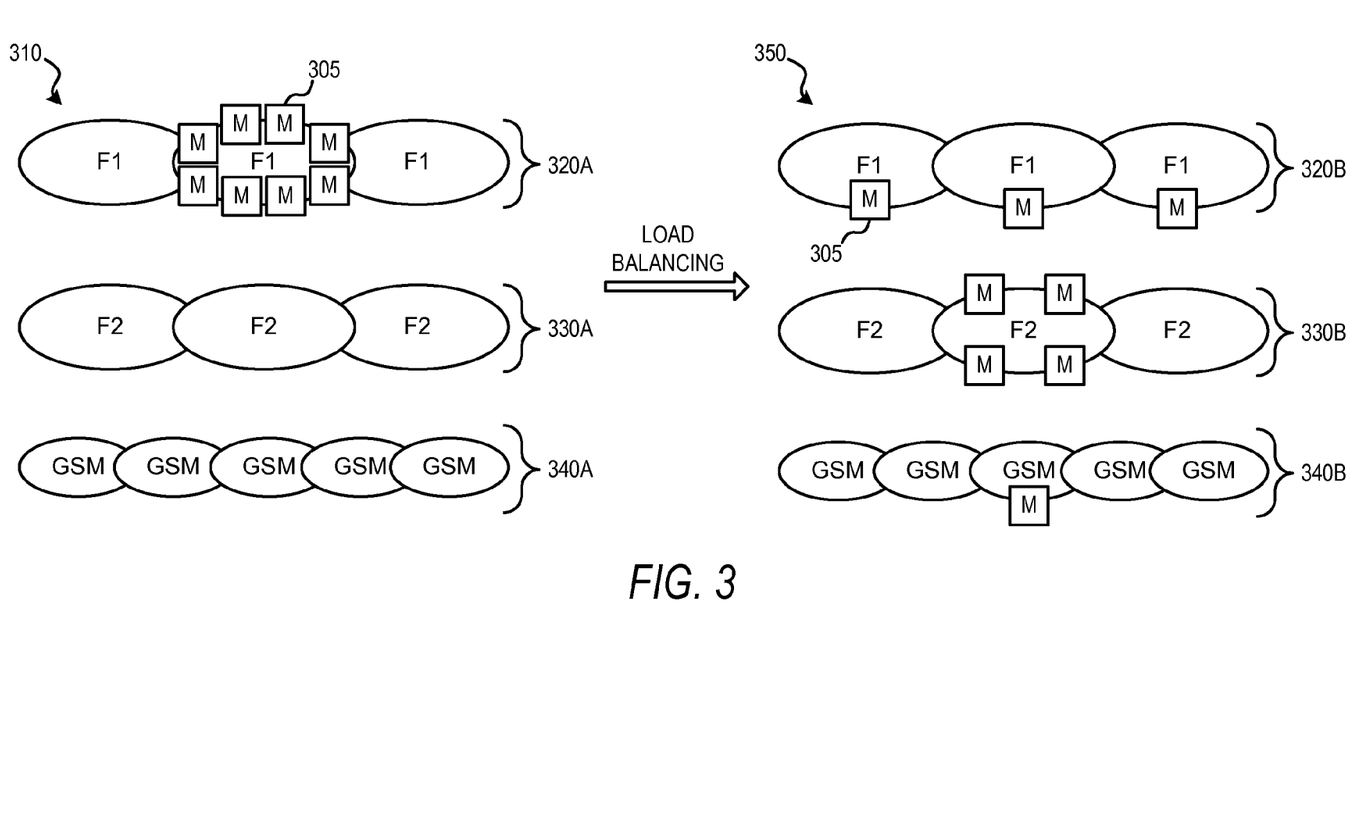
FIG. 3 is a mobile traffic allocation diagram illustrating load balancing among three types of neighbors to rebalance traffic away from a congested cell according to one exemplary embodiment.

Referring now to FIG. 3, a mobile traffic allocation diagram illustrates load balancing among three types of neighbors to rebalance traffic away from a congested cell according to one exemplary embodiment. A mechanism for load balancing can modify handover and reselection parameters after considering various handover and reselection thresholds. Such considerations can occur at the cell level or at the level of neighboring cells. The consideration can also occur at three different neighbor levels: intra-frequency (IAF) neighbors using the same carrier, inter-frequency (IEF) neighbors using different carriers, and inter-system (IS) neighbors in different radio access networks (RAN). Additional details related to interlayer handovers are disclosed in co-pending U.S. patent application Ser. No. 11/847,172, filed on Aug. 29, 2007, entitled "Optimization of Interlayer Handovers in Multilayer Wireless Communication Networks," which is assigned to the assignee of the instant patent application and is expressly incorporated herein by reference in its entirety.

In the illustrated example, an initial traffic pattern 310 has eight mobile radios 305 in a central cell using the frequency F1. Other neighbors using the same frequency F1 and intra-frequency (IAF) neighbors 320A and have no mobile radio traffic. Neighbors using a difference carrier F2 are inter-frequency (IEF) neighbors 330A and also have no mobile radio traffic. Neighbors using other GSM systems are inter-system (IS) neighbors 340A and also have no mobile radio traffic.

After a load balancing procedure, a load balanced traffic pattern 350 illustrates the same eight mobile radios 305 that have been handed over to neighbors to balance the traffic load. The load balanced IAF neighbors 320B have three of the mobiles 305 allocated one each to each of three neighbors. The central neighbor among the IEF neighbors 330B using F2 has four of the mobiles 305. Also, the nearest GSM neighbor of the other GSM IS neighbors 340B has one of the mobiles 305.

During the load balancing, cells can be collapsed or expanded to trigger handovers earlier or later than the original configuration. Handover and reselection parameters can be changed accordingly. This can maintain a match cell borders and reduce the volume of early handovers. Overloaded cells can be collapsed while low or medium loaded cells can be expanded.

IAF, IEF and IS neighbors may be treated differently by applying different threshold ranges. Neighbor level parameters can bias some neighbors against others and finely redirect traffic loads to less loaded neighbors. Cell level parameters can be used when neighbor level parameters are not available or when the neighbor level parameter adjustment is less inefficient in mitigating a given capacity problem. Neighbor parameters can be applied as offsets that are added to measured values for neighboring cells. Application of the offset can bias the cell using a positive or negative value. The cell border can be redefined unequally depending on the overlapping areas between neighbors.

Figure 4:
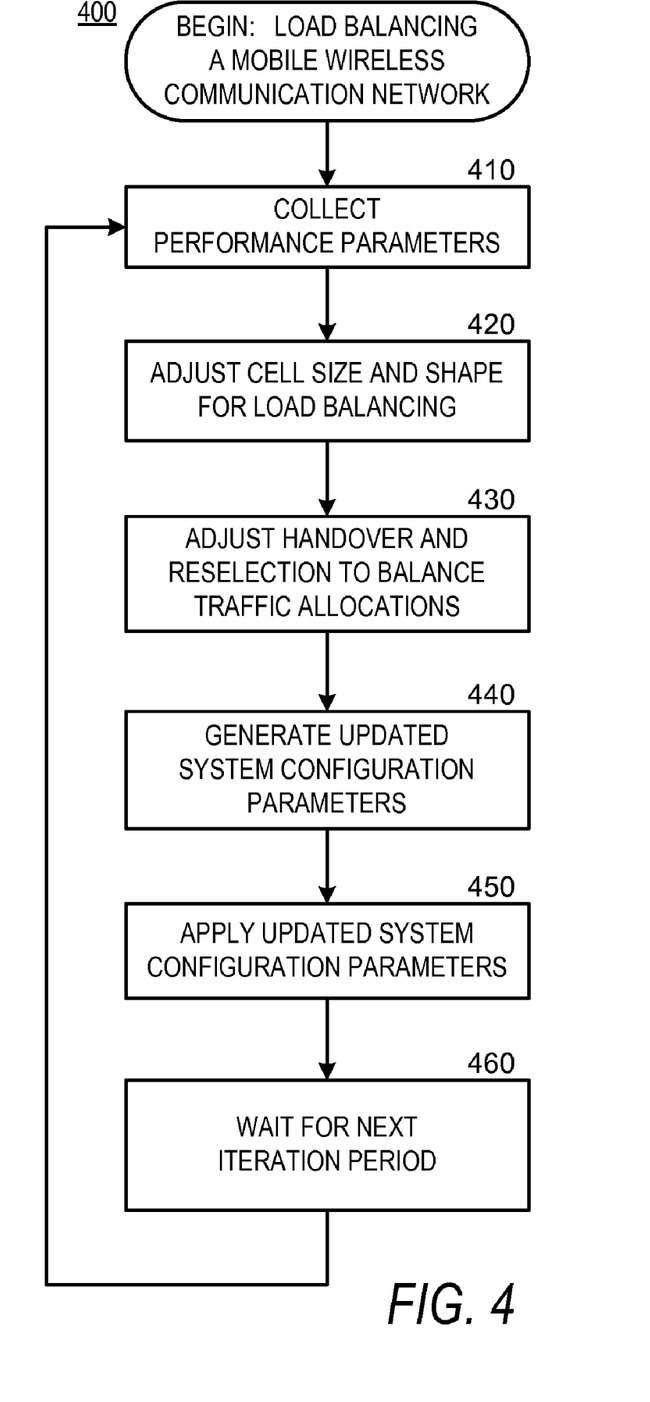
FIG. 4 is a logical flow diagram illustrating a process load balancing in a mobile wireless network according to one exemplary embodiment.

Turning now to FIG. 4, additional details will be provided regarding the embodiments presented herein for improving system capacity within a mobile wireless radio network using load balancing. In particular, FIG. 4 is a flow diagram showing a routine 400 that illustrates aspects of a process for load balancing in a mobile wireless network according to one exemplary embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 400 can begin with operation 410 where performance parameters and configuration information is collected from the wireless network. The configuration and performance items may be retrieved, in whole or in part, from the operation and support system (OSS). Key performance indicators (KPI) can be collected to determine the need for system adjustments. Load balancing can be triggered by traffic congestion or over-utilization of neighboring cells.

A neighbor capacity KPI can be defined in two different ways. A first definition for the neighbor capacity KPI can apply the same capacity KPI used for the reference cell in the neighbor cell. A second definition for neighbor capacity KPI can be the average of each cell capacity KPI defined in the reference cell neighbor list weighted by the number of outgoing handovers to each neighbor.

At operation 420, cell size and shape can be adjusted to balance traffic load between neighboring cells. Reshaping neighboring cells can reallocate traffic from a highly loaded cell to a neighboring cell with spare capacity. Cell coverage adjustment can be accomplished using pilot power adjustment. Pilot power can be adjusted between neighboring cells so as to displace the center point between the two cells to shift the center between the two cells closer to the overloaded cell and effectively reduce the size of the overloaded cell. Cell coverage adjustment can be also accomplished using remote electrical antenna tilt (RET) to provide downward tilt to an antenna in an overloaded cell. Applying a downward tilt can reduce the propagation horizon of the antenna and effectively reduce the size of the overloaded cell.

At operation 430, handover and reselection can be adjusted to balance traffic load between neighboring cells after considering specified handover and reselection thresholds. The threshold comparisons and adjustments can occur at the level of a particular cell or at the level of a set of neighboring cells. Traffic reallocation can occur at three different neighbor levels: intra-frequency (IAF) neighbors using the same carrier, inter-frequency (IEF) neighbors using different carriers, and inter-system (IS) neighbors in different radio access networks (RAN).

At operation 440, updated system configuration parameters can be generated according to adjustments determined in operation 420 and operation 430. System parameters can be adjusted on two different levels. Firstly, parameters can be adjusted at the cell level. Secondly, neighbor level parameters can be adjusted. These neighbor parameters can be considered per adjacency relationship.

Generally, the step applied in updating configuration parameters can be small with respect to the range allowed for each parameter. Such a small step refinement can support slow convergence within the configuration update algorithm. A slow parameter convergence can minimize second order effects within the control system.

At operation 450, the updated system configuration parameters as determined in operation 440 can be applied to the various configurable subsystems within the wireless radio network. Operation 460 can comprise a delay or wait cycle for the beginning of the next iteration period. The iteration period can determine the timing of the iterative process that collections system parameters and updates configuration parameters based on a periodic cycle. The period can be determined by a counter, timer, clock, real-time clock, interrupt, or other source of periodic scheduling or timing.

The performance parameters and KPI data can be collected for a predefined measurement period. Generally, a longer collection period can provide improved stability and reliability of the statistics. However, the increased collection period can provide a control system that is less reactive to changes. After operation 460, the routine 400 can loop back to operation 410 to collect the next set of performance parameters.

Figure 5:
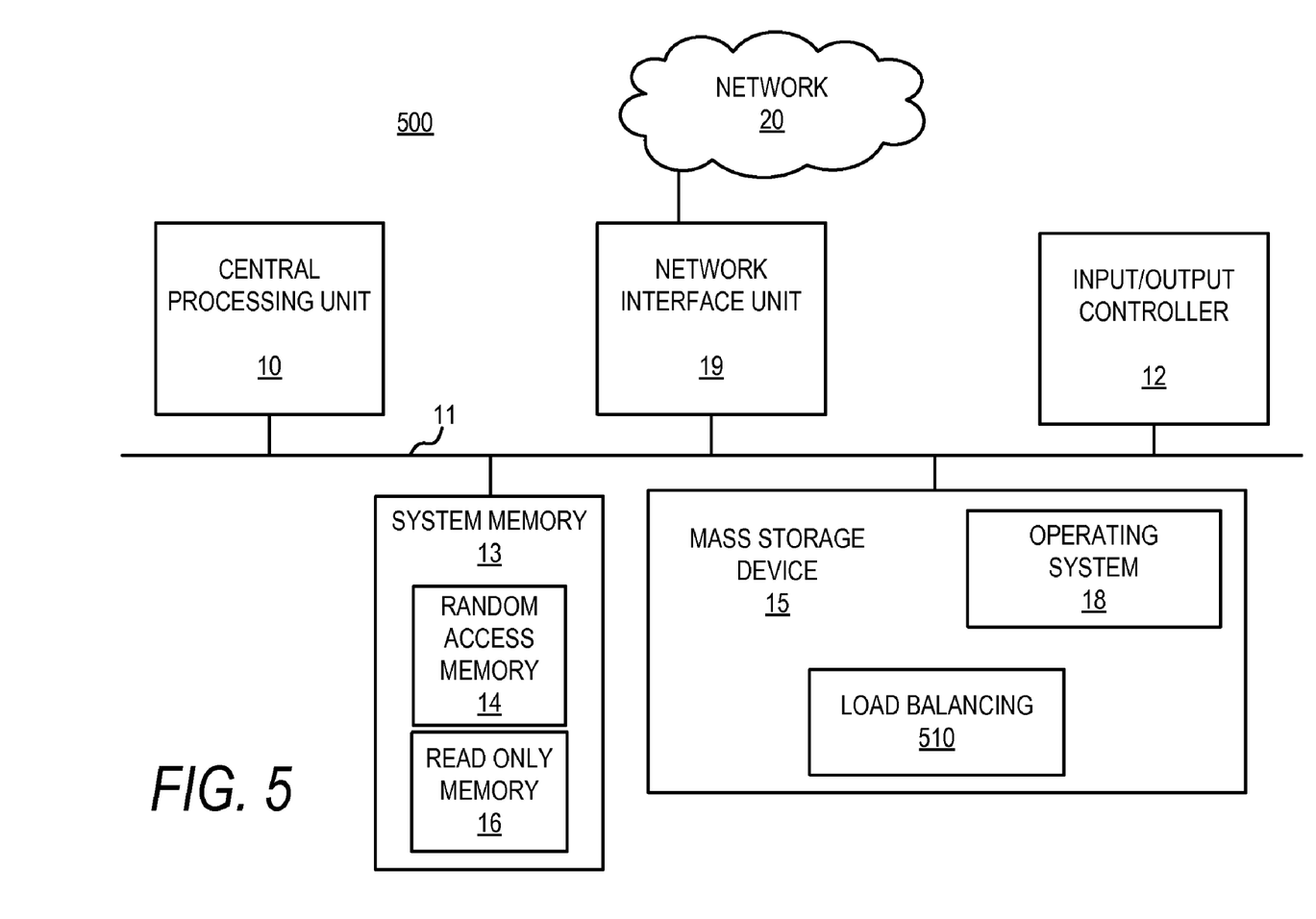
FIG. 5 is a computer architecture diagram illustrating computing system hardware capable of traffic load balancing within a mobile wireless radio network according to one exemplary embodiment.

Turning now to FIG. 5, an illustrative computer architecture 500 can execute software components described herein for improving system capacity within a mobile wireless radio network using load balancing. The computer architecture shown in FIG. 5 illustrates an embedded control computer, a conventional desktop, a laptop, or a server computer and may be utilized to execute aspects of the software components presented herein. It should be appreciated however, that the described software components can also be executed on other example computing environments, such as mobile devices, television, set-top boxes, kiosks, vehicular information systems, mobile telephones, embedded systems, or otherwise.

The computer architecture illustrated in FIG. 5 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 500, such as during startup, can be stored in the ROM 16. The computer 500 may further include a mass storage device 15 for storing an operating system 18, software, data, and various program modules, such as those associated with the load balancing system 510.

The mass storage device 15 can be connected to the CPU 10 through a mass storage controller (not illustrated) connected to the bus 11. The mass storage device 15 and its associated computer-readable media can provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 20. The computer 500 may connect to the network 20 through a network interface unit 19 connected to the bus 11. It should be appreciated that the network interface unit 19 may also be utilized to connect to other types of networks and remote computer systems. The computer 500 may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

As mentioned briefly above, a number of program modules and data files may be stored in the mass storage device 15 and RAM 14 of the computer 500, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the natural language engine 130 for execution by the CPU 10. The load balancing system 510 can include software components for implementing portions of the processes discussed in detail with respect to FIGS. 1-4. The mass storage device 15, the ROM 16, and the RAM 14 may also store other types of program modules.

Based on the foregoing, it should be appreciated that technologies for improving system capacity within a mobile wireless radio network using load balancing are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for load balancing within a mobile wireless communications network, the method comprising:
    collecting performance parameters from the mobile wireless communications network, the performance parameters being collected for a cell in the mobile wireless communications network;

determining, based upon the collected performance parameters, that load balancing is to be performed for the cell;
identifying a neighboring cell comprising a further cell of the mobile wireless communications network that is adjacent to the cell;
adjusting a cell geometry for the neighboring cell in the mobile wireless communications network by adjusting one or more of a size of the neighboring cell, an antenna tilt of an antenna associated with the neighboring cell, or a pilot power associated with the neighboring cell, and
adjusting a handover parameter of the neighboring cell and a handover parameter of the cell to balance a load between the cell and the neighboring cell by reallocating traffic from the cell to the neighboring cell.

2. The method of claim 1, further comprising adjusting a further cell geometry for the cell by adjusting a size of the cell.

3. The method of claim 1, further comprising adjusting a further cell geometry for the cell by adjusting an antenna tilt associated with the cell.

4. The method of claim 1, further comprising adjusting a further cell geometry for the cell by adjusting a pilot power associated with the cell.

5. The method of claim 1, wherein adjusting the handover parameter of the neighboring cell comprises adjusting a parameter in the mobile wireless communications network for reallocating traffic from an overloaded cell to a neighboring cell operating on the same carrier frequency as the overloaded cell.

6. The method of claim 1, wherein adjusting the handover parameter of the neighboring cell comprises adjusting a parameter in the mobile wireless communications network for reallocating traffic from an overloaded cell to a neighboring cell operating on a different carrier frequency than the overloaded cell.

7. The method of claim 1, wherein adjusting the handover parameter of the neighboring cell comprises adjusting a parameter in the mobile wireless communications network for reallocating traffic from an overloaded cell to a cell in a different radio access network than the overloaded cell.

8. A non-transitory computer storage medium having computer-executable instructions stored thereon that, when executed by a computer system, cause the computer system to:
collect performance parameters from a mobile wireless communications network, the performance parameters being collected for a cell in the mobile wireless communications network and at least one neighboring cell comprising a further cell of the mobile wireless communications network that is adjacent to the cell;
determine, based upon the collected performance parameters, that load balancing is to be performed for the cell and the neighboring cell;
adjust a cell geometry for the neighboring cell adjusting a size of the neighboring cell, an antenna tilt of an antenna associated with the neighboring cell, and a pilot power associated with the neighboring cell;
adjust a further cell geometry for the cell by adjusting a size of the cell, an antenna tilt of an antenna associated with the cell, and a pilot power associated with the cell; and
adjust a handover parameter of the neighboring cell and a handover parameter of the cell to balance a load between the cell and the neighboring cell by reallocating traffic from the cell to the neighboring cell.

9. The method of claim 8, wherein adjusting the cell handover parameter comprises adjusting a parameter in the mobile wireless communications network for reallocating traffic from the cell to a neighboring cell operating on the same carrier frequency as the cell.

10. The computer storage medium of claim 8, wherein adjusting the cell handover parameter comprises adjusting a parameter in the mobile wireless communications network for reallocating traffic from the cell to a neighboring cell operating on a different carrier frequency than the cell.

11. The computer storage medium of claim 8, wherein adjusting the cell handover parameter comprises adjusting a parameter in the mobile wireless communications network for reallocating traffic from the cell to a cell in a different radio access network than the cell.

12. The computer storage medium of claim 8, wherein adjusting the handover parameter of the neighboring cell comprises adjusting a parameter in the mobile wireless communications network for reallocating traffic from an overloaded cell to a neighboring cell operating on the same carrier frequency as the overloaded cell.

13. The computer storage medium of claim 8, wherein adjusting the handover parameter of the neighboring cell comprises adjusting a parameter in the mobile wireless communications network for reallocating traffic from an overloaded cell to a neighboring cell operating on a different carrier frequency than the overloaded cell.

14. The computer storage medium of claim 8, wherein adjusting the handover parameter of the neighboring cell comprises adjusting a parameter in the mobile wireless communications network for reallocating traffic from an overloaded cell to a cell in a different radio access network than the overloaded cell.

15. A load balancing system comprising:
a load balancing controller;
one or more interfaces between the load balancing controller and a mobile wireless communications network;
a processing unit associated with the load balancing controller; and
a storage device storing one or more modules for execution on the processing unit which, when executed by the processing unit, cause the processing unit to collect performance parameters from the mobile wireless communications network, the performance parameters being collected for a cell in the mobile wireless communications network, to determine, based upon the collected performance parameters, that load balancing is to be performed for the cell, identify a neighboring cell comprising a further cell of the mobile wireless communications network that is adjacent to the cell, adjust a cell geometry for the neighboring cell in the mobile wireless communications network by adjusting one or more of a size of the neighboring cell, an antenna tilt of an antenna associated with the neighboring cell, or a pilot power associated with the neighboring cell, and adjust a handover parameter of the neighboring cell and a handover parameter of the cell to balance a load between the cell and the neighboring cell by reallocating traffic from the cell to the neighboring cell.

16. The load balancing system of claim 15, wherein execution of the modules by the processor further cause the processor to adjust a further cell geometry of the cell by adjusting an antenna tilt of an antenna associated with the cell.

17. The load balancing system of claim 15, wherein execution of the modules by the processor further cause the processor to adjust a further cell geometry of the cell by adjusting a pilot power associated with the cell.

18. The load balancing system of claim 15, wherein adjusting the handover parameter of the neighboring cell comprises adjusting a parameter in the mobile wireless communications network for reallocating traffic from an overloaded cell to a neighboring cell operating on the same carrier frequency as the overloaded cell.

19. The load balancing system of claim 15, wherein adjusting the handover parameter of the neighboring cell comprises adjusting a parameter in the mobile wireless communications network for reallocating traffic from an overloaded cell to a neighboring cell operating on a different carrier frequency as the overloaded cell.

20. The load balancing system of claim 15, wherein adjusting the handover parameter of the neighboring cell comprises adjusting a parameter in the mobile wireless communications network for reallocating traffic from an overloaded cell to a cell in a different radio access network than the overloaded cell.

\* \* \* \* \*

UNITED STATES PATENT AND TRADEMARK OFFICE
CERTIFICATE OF CORRECTION

| | | |
|---|---|---|
| PATENT NO. | : 8,301,156 B2 | Page 1 of 1 |
| APPLICATION NO. | : 12/237910 | |
| DATED | : October 30, 2012 | |
| INVENTOR(S) | : del Rio-Romero et al. | |

It is certified that error appears in the above-identified patent and that said Letters Patent is hereby corrected as shown below:

In Column 5, Line 4, delete "antennae" and insert -- antenna --, therefor.

In Column 9, Line 54, in Claim 8, delete "cell" and insert -- cell by --, therefor.

Signed and Sealed this
Second Day of April, 2013

Teresa Stanek Rea
*Acting Director of the United States Patent and Trademark Office*